Jan. 12, 1932. F. WUNSCH 1,840,650
SPEED CONTROL APPARATUS
Filed Dec. 31, 1926
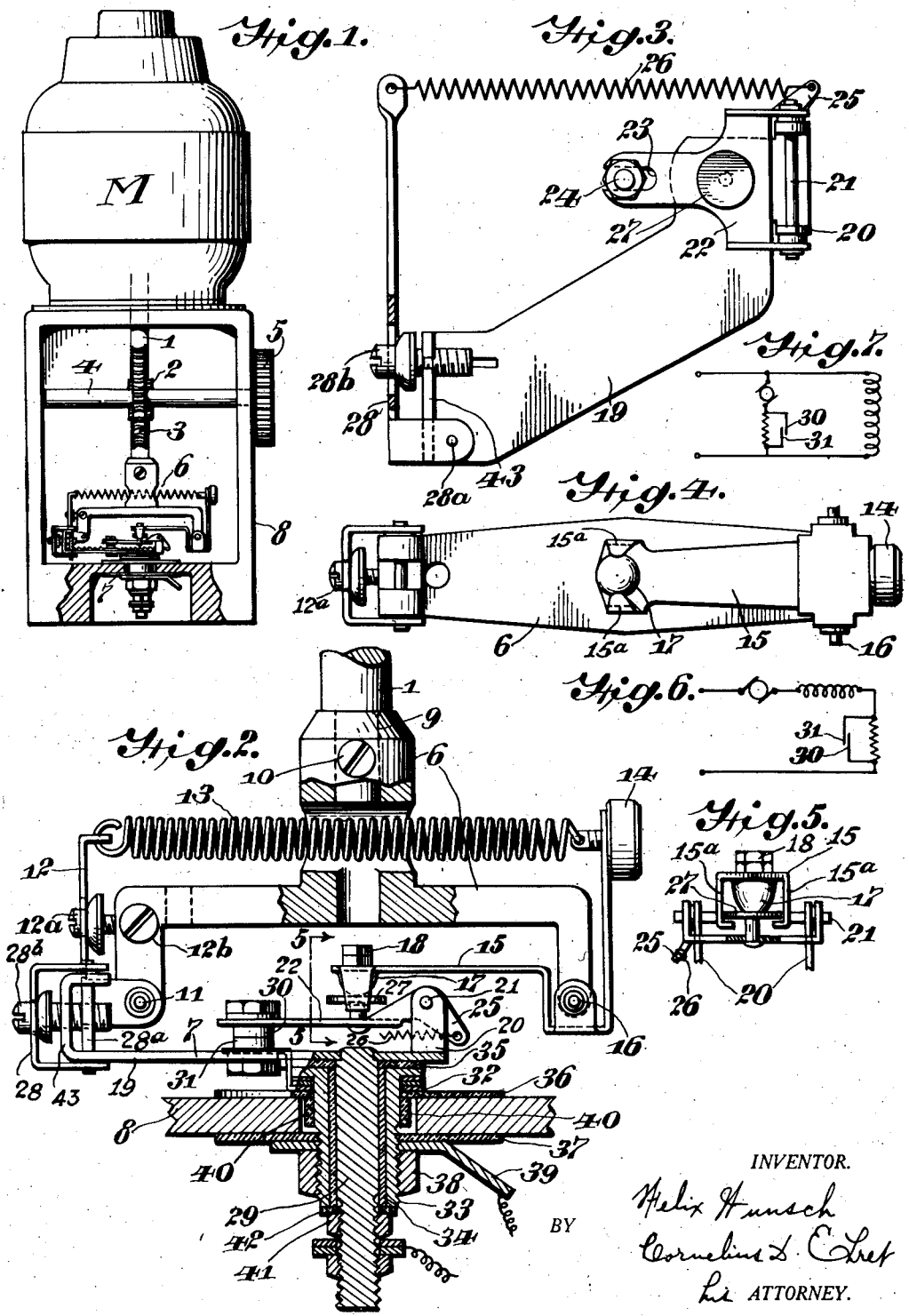
INVENTOR.
Felix Wunsch
Cornelius D. Ehret
BY
his ATTORNEY.

Patented Jan. 12, 1932

1,840,650

UNITED STATES PATENT OFFICE

FELIX WUNSCH, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA

SPEED CONTROL APPARATUS

Application filed December 31, 1926. Serial No. 158,372.

My invention relates to speed control apparatus for maintaining constant the speed of mechanism driven by a motor, and more particularly to a governor for maintaining constant the angular velocity of the rotor of an electric motor used for timing purposes, such as for driving clocks, or for any purpose where constant speed is desired, under varying conditions of load on the driving mechanism, of impressed voltage on the driving motor, or both.

My invention resides in a centrifugal device or governor for maintaining at a desired speed the moving element of a driving means, more particularly for maintaining constant the angular velocity of the rotor of an electric motor, so constructed that it is possible to determine more particularly, to determine with great precision, the desired speed or angular velocity while the device is in motion.

My invention further resides in a motor-driven centrifugal device or governor of the type which actuates operating contacts, to effect speed control of a driving motor, more particularly, to cut a resistance or impedance into or out of the motor circuit, so constructed that the pressure between the contacts is uniform, with the result that the contact resistance is low and constant.

My invention resides in further features of novelty hereinafter described and claimed.

For illustration of a form which my invention may take, reference is made to the accompanying drawings, in which:—

Fig. 1 is an elevational view, partly in section, illustrating a centrifugal governor embodying my invention, driven by and controlling the speed of an electric motor.

Fig. 2 is an elevational view of the movable and stationary elements of the governor with parts in section.

Fig. 3 is a top plan view of part of the stationary element of the governor.

Fig. 4 is a bottom plan view of the rotatable governor member.

Fig. 5 is a fragmentary view taken on line 5—5 of Fig. 2.

Figs. 6 and 7 show possible circuit arrangements, in diagrammatic form, for effecting speed control of different types of motor by means of my governor device.

Referring to Fig. 1, M is a motor having a rotatable armature fastened on a shaft 1 mounted in bearings in the usual manner. A worm gear 2 fastened to the shaft 1 is in engagement with a worm wheel 3 to drive a shaft 4 connected by means of the gear 5 to any suitable device or mechanism whose speed is to be controlled with great precision. It is to be understood, however, that such mechanism may be directly driven from the shaft 1. The rotatable element 6 of the governor is held in any suitable manner, such as by a set screw, to an end of the shaft 1 and rotates therewith. The stationary or contact-carrying member of the governor 7 is rigidly clamped to the housing 8 which may also serve as a mounting for the motor M, as shown.

The hub portion of the rotating or centrifugal element 6 is provided with a bore 9 to receive an extension of the shaft 1, which is locked in position by means of a set screw 10. Fastened to, or integral with the hub portion, is a yoke or U-shaped member, provided with pins 11 and 16, each of which extend transversely through the free end of a leg of the yoke. The pin 11 serves as a pivot for a slotted, L-shaped member 12, which, at an extreme end, is adapted to receive the end of a tension spring 13. The shoulder-portion of a screw 12a, threaded into the yoke member, is utilized as an adjustable stop for moving the slotted member 12 to obtain a desired tension of the spring 13. The head of the screw 12a, extends through the slot in member 12 to facilitate an adjustment of the screw by means of a screw-driver, or other suitable tool. When the desired adjustment has been made, the screw may be locked in position by the clamping screw 12b, or in any other suitable manner. The spring 13 passes through a hole in the hub portion of the movable member 6, and is fastened at its other end to the threaded extension of a fly ball 14 secured to one extremity of a pivoted member 15. The other extremity of the member 15, which is pivoted on pin 16, is provided with downwardly extending lugs, having each a hooked portion for a purpose hereinafter described. Passing through the same end of this member and held fast thereto by means of the clamping nuts 18, is a bearing member 17, preferably of fibre, which cooperates with a part of the stationary or contact carrying structure in the axis of rotation of the rotating element. When the speed of the motor is below the desired or critical speed, the member 15 is biased by means of the spring 13 to the position shown in Fig. 2. The strength of the spring bias, as previously described, is adjustable by means of the screw 12a and the lever 12. When the motor speed is higher than the desired speed, the centrifugal force acting on the fly ball 14 overcomes the tension of the spring 13, modified as hereinafter described, and causes member 15 to rotate about pin 16 in a clockwise direction.

The stationary or contact-carrying member of the governor consists of a plate 19, having a pair of upturned lugs 20, through which extends the pivot pin 21. A movable member 22 is provided with bearings in a pair of projecting ears, which cooperate with the pin 21. On one side of the pivot, the member 22 has a slot 23, to provide a ready means for adjustably positioning a movable contact member 24, which is held in the desired position by a nut or other suitable means. On the other side of the pivot point, the member 22 has an extension 25 bent at an angle thereto, which receives an end of a relatively-fine tension-spring 26. The plate 19 is formed with an upwardly extending portion 43, which locates the pin 28a, on which is pivoted the bifurcated L-shaped member 28, adapted to engage at its extremity, the other end of the spring 26. A screw 28b is threaded into a tapped hole in the upstanding portion 43 and has a shoulder portion which serves as an adjustable limiting-stop for the member 28. An extension of this screw passes through a slot in the member 28, to provide a ready means for adjusting the tension of the spring 26.

The movable member 22 is provided with a button 27, preferably made of some wear-resisting material or hardened to prevent wear, which is intended to be in contact with the fiber bearing member 17 of the rotating element, during normal operation of the governor. This member, which is fastened in any suitable manner to the member 22, such as by riveting, is so shaped that the hooked portions of the downwardly extending ears 28 of the member 15 may, under circumstances to be later described, cause the rotation of the movable member 22 about its axis 21.

It should be noted at this point that the spring 26 tends to cause the rotation of the movable member 22 in a clockwise direction, and, since this member is, by means of the button 27, in engagement with the member 15, it also tends to cause the clockwise rotation of the latter about its axis 16, which tendency is contrary to that due to spring 13. When the device is at rest, the screw 12a may be adjusted to regulate the tension of spring 13 through a considerable range, which serves as a rough adjustment for approximating a desired speed or angular velocity. Since the spring 26 is opposite in effect on the member 15 to that of spring 13 and the adjusting means therefor is on the stationary plate 19, it is apparent that a desired operating velocity of the governor can be precisely effected by this latter adjustment, even while the motor is running.

The relative positions of the movable and stationary members of the governor are such that when the motor is running below the critical speed, the bearing members 17 and 27 are just touching in line with the axis of rotation of the centrifugal member, and the contacts are closed. When the speed of the motor rises above that point, the member 15 rotates in a clockwise direction about its axis 16 as described and the contact member 22 follows it under the influence of spring 26. If, however, the contacts tend to stick or weld, the hooked portions 15a, of the member 15, after a slight movement, engage the under side of the button 27 and cause positive movement of member 22 to separate them.

A threaded member 29 is riveted or otherwise fastened to the plate 19 and serves both as a means for conducting the current to the movable contact and for holding the plate in a fixed position. The contact 31 is carried by a slotted bracket extending from a ring 32, which is in contact with a threaded sleeve 33, surrounding the extension 29, but insulated therefrom by the sleeve of insulation 34 and separated from the plate 19 by an insulating washer 35. An insulating collar 40 prevents the sleeve from making contact with the housing 8. A lug 39, in contact with the sleeve 33, provides a means for conducting current to the stationary contact 31. The nut 38, threaded on the flanged sleeve 33, clamps ring 32, lug 39 and insulating washers 36 and 37 to the housing, as shown in Fig. 2. The plate 19 is held rigid with this assembly by means of the clamping nut 41 and the insulating washer 42.

In actual practice, it has been found that when one of the contact members of a governor of this type was on a part rotating with the shaft and current was conducted thereto through the motor bearings, that deterioration of the bearing was no uncommon occurrence. An alternate construction, using a ring and brush contact, was also found to be unsatisfactory because of the mechanical and electrical defects in brush contact systems. With the structure described both contact members are mounted independently of the rotating structure, with a resulting freedom from troubles due to brush contacts, and from bearing failure. This structure also possesses the advantage that the contacts remain stationary with respect to each other except at the time of the making and breaking of the circuit necessary to control angular velocity of the motor armature. There is, therefore, no chattering of contacts caused by relative rotation between them. Further, as there is no positive connection between the rotating part and the contact controlled by it, perfect alignment of the axis of rotation and the connection between these members is not necessary to secure satisfactory operation. In governors having a direct connection between the rotating member and the controlled contact, the slightest eccentricity of the connections between these members results in either actual chattering of the contacts, or at least a substantial variation of the contact pressure. In either case the contact resistance fluctuates widely, in some cases from a fraction of an ohm to several hundred ohms, with resultant imperfect circuit-control. In my device, the contact pressure is uniform and the contact resistance low and constant, with the consequence that a more perfect control of the rotor velocity is obtainable.

*Operation of the device*

The speed of the driving mechanism is controlled by decreasing or increasing the current applied to the motor by means of a resistance or impedance, which is put in the motor circuit to decrease the current or short-circuited to increase the current, depending upon the particular type of motor and auxiliary circuit used. In each case this is accomplished by the opening and closing of the contacts 30 and 31. The following explanation is confined to an arrangement in which a resistance is cut into circuit to reduce the rotor speed. The making and breaking of the contacts is, as before explained, controlled by the fly ball 14, lever 15 and bearing 17, or, more accurately, by the magnitude of the centrifugal forces developed by the fly ball and the lever. When the generator is rotating below the desired speed, the torque, due to the centrifugal forces acting on the fly ball and the lever because of their rotation, is less than the torque exerted by the springs 26 and 13 about the axis of the pin 16. If the angular velocity is increased to such an extent that it rises above the predetermined critical speed, the torque, due to the centrifugal forces acting on the fly ball and the lever, becomes greater than the torque in the opposite direction from the tension of the springs, and, in consequence, the system rotates about the pin 16. The bearing 17, because of this rotation, is displaced towards the U-frame, and is followed by the bearing 27, under the influence of spring 26, thereby allowing the contacts 30 and 31 to open. By this movement, a resistance, connected across the contacts and shunted by them when they are in engagement, is now inserted in the motor circuit. The driving motor slows down because of the resulting decrease in current, until the angular velocity is slightly below the critical speed. At this instant the torque, due to the centrifugal force, is lessened, the torque, due to the spring tensions prevails, and the contacts are again closed. The angular velocity of the motor increases again until the velocity is greater than the desired governing velocity, whereupon the cycle of operation is then repeated.

Fig. 6 shows the circuit arrangement of the governor when applied to a series motor and Fig. 7 as applied to a shunt motor. In Fig. 6, when the critical speed is exceeded, the resistance or impedance R in an auxiliary circuit is inserted in series with the armature and field of the motor. The effect is to reduce the voltage applied, and, therefore, the armature speed drops until the counter electromotive force generated balances the reduced voltage applied. The subsequent operation is as previously explained.

In Fig. 7, upon the attainment of a speed in excess of the critical speed, the resistance R is inserted in series with the armature, the field remaining fully energized. In this case, since the field strength remains the same and the voltage applied to the armature is reduced, it is apparent that the rotor speed will drop until, as in the case of the series motor, the counter electromotive force generated balances the reduced voltage applied to the armature.

These two figures illustrate but two of the many possible arrangements for effecting speed control of motors of different types and by different auxiliary circuits.

What I claim is:—

1. Speed control apparatus comprising a centrifugal member, contacts controlled thereby, means independent of said member for normally operating one of said contacts, and means connected to said member for operating the same contact upon failure of the normal operating means.

2. Speed control apparatus comprising a centrifugal element, a fixed contact, a movable contact cooperating therewith, an independent biasing means therefor, said movable contact being permitted to move in accordance with its bias by said centrifugal element, and means to positively move said movable contact in the same direction if said biasing means is ineffective.

3. Speed control apparatus comprising a centrifugal element, a fixed contact, a movable contact co-operating and in engagement therewith, an independent biasing means therefor, said movable contact being permitted to move in accordance with its bias and follow said centrifugal element, and means associated with said centrifugal member, to positively move said movable contact in the same direction if said biasing means is ineffective.

4. Speed control apparatus comprising a rotatable support for a centrifugal element, a stationary support having a pair of contacts mounted thereon, one of said contacts being movable and resiliently biased towards said element and detachably engaging the same, whereby said movable contact is in continuous following engagement with said element, and a spring carried by said rotatable support biasing said element into engagement with said movable contact.

5. Speed control means comprising a centrifugal member movable in response to velocities in excess of a critical velocity, a spring rotatable with and opposing movement of said centrifugal member, a fixed contact, a movable contact normally held in engagement with said fixed contact by said spring, means for biasing said movable contact for movement from said fixed contact, a stationary support for said contacts and said biasing means, and means including said biasing means to determine said critical velocity while said member is rotating.

6. Speed control means comprising a centrifugal member movable in response to velocities in excess of a critical velocity, an adjustable spring rotatable with and opposing movement of said centrifugal member, a fixed contact, a movable contact biased for movement away from said fixed contact but normally held in engagement therewith by said spring, and a stationary support for said contacts.

7. Speed control means comprising a centrifugal member movable in response to velocities in excess of a desired velocity, tensioned means adjustable to approximate said velocity when said member is at rest, and a second tensioned means opposing said first tensioned means and adjustable precisely to determine said velocity within appreciable limits while said member is in motion.

8. Apparatus for controlling the speed of a motor comprising a centrifugal member movable in response to velocities in excess of a desired velocity, contacts having only reciprocating relative movement actuated solely upon movement of said member in response to excessive velocities, means to approximate said desired velocity when said member is at rest, and means to adjust precisely said velocity while said member is in motion.

9. Apparatus for controlling the speed of a motor comprising a centrifugal member movable in response to velocities in excess of a desired velocity in opposition to a spring, means for approximately determining said velocity when said member is at rest, a stationary support, a fixed and a movable contact mounted on said support and normally held in engagement by said spring, a second spring biasing said movable contact toward open-circuit position, and means for adjusting said second spring precisely to adjust said velocity while said member is in motion.

FELIX WUNSCH.